(12) United States Patent
Arita et al.

(10) Patent No.: US 11,855,574 B2
(45) Date of Patent: Dec. 26, 2023

(54) CONTROL DEVICE, CONVEYANCE DEVICE, ELECTRIC CYLINDER, AND STORAGE MEDIUM

(71) Applicant: HIRATA CORPORATION, Kumamoto (JP)

(72) Inventors: Naoto Arita, Kumamoto (JP); Satoshi Nishimoto, Kumamoto (JP); Koichi Nakano, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 17/848,817

(22) Filed: Jun. 24, 2022

(65) Prior Publication Data
US 2022/0360201 A1 Nov. 10, 2022

Related U.S. Application Data

(63) Continuation of application No. PCT/JP2021/005007, filed on Feb. 10, 2021.

(30) Foreign Application Priority Data

Mar. 5, 2020 (WO) .................. PCT/JP2020/009469

(51) Int. Cl.
*H02P 29/00* (2016.01)
*H02P 6/30* (2016.01)
(Continued)

(52) U.S. Cl.
CPC ................ *H02P 6/30* (2016.02); *B65G 13/06* (2013.01); *H02P 6/00* (2013.01); *H02P 6/20* (2013.01); *B65G 2203/0291* (2013.01)

(58) Field of Classification Search
CPC ...... H02P 6/30; H02P 6/08; H02P 6/20; H02P 29/00; F03D 9/25
See application file for complete search history.

(56) References Cited

U.S. PATENT DOCUMENTS

2017/0170755 A1  6/2017  Okamoto et al.
2017/0345288 A1  11/2017  Tanisugi et al.
(Continued)

FOREIGN PATENT DOCUMENTS

CN   105409112 A   3/2016
CN   108322124 A   7/2018
(Continued)

OTHER PUBLICATIONS

International Search Report (PCT/ISA/210) with translation and Written Opinion (PCT/ISA/237) dated May 26, 2020, by the Japan Patent Office as the International Searching Authority for International Application No. PCT/JP2020/009469. (11 pages).

(Continued)

*Primary Examiner* — Cortez M Cook
(74) *Attorney, Agent, or Firm* — BUCHANAN INGERSOLL & ROONEY PC

(57) ABSTRACT

A control device includes first and second input terminals to which a DC voltage for driving a motor is input, and a control unit. The control unit sets a rotation direction of the motor based on first input to the first input terminal or the second input terminal. A rotation speed of the motor is changed based on a subsequence input of the DC voltage.

13 Claims, 11 Drawing Sheets

(51) Int. Cl.
    *B65G 13/06*     (2006.01)
    *H02P 6/00*     (2016.01)
    *H02P 6/20*     (2016.01)

(56) References Cited

U.S. PATENT DOCUMENTS

| | | | |
|---|---|---|---|
| 2018/0183363 | A1 | 6/2018 | Sakamoto |
| 2018/0323737 | A1* | 11/2018 | Masillamani ............ F03D 9/25 |
| 2019/0149070 | A1 | 5/2019 | Hashimoto et al. |

FOREIGN PATENT DOCUMENTS

| | | | |
|---|---|---|---|
| CN | 108963977 | A | 12/2018 |
| JP | 2000060182 | A | 2/2000 |
| JP | 4531079 | B2 | 8/2010 |
| JP | 5268096 | B2 | 8/2013 |
| JP | 2014161201 | A | | 9/2014 |
| JP | 2016144344 | A | | 8/2016 |
| JP | 2018137987 | A | | 8/2018 |
| JP | 2018137987 | A | * | 8/2018 |
| JP | 2018141377 | A | | 9/2018 |
| JP | 2018141377 | A | * | 9/2018 |
| JP | 6488490 | B1 | | 3/2019 |
| JP | 6541827 | B2 | | 7/2019 |
| TW | 201001897 | A | | 1/2010 |
| TW | 201029311 | A | | 8/2010 |

OTHER PUBLICATIONS

Taiwan Office Action for Application No. 110107461 dated Feb. 10, 2021. (10 pages).

Extended European Search Report dated Jan. 3, 2023, issued in corresponding European Application No. 21763506.9. (9 pages).

* cited by examiner

| NUMBER OF CHANGES | CHANGE CONDITION (CUMULATIVE TIME OF INPUT) | SPEED |
|---|---|---|
| FIRST TIME | 100msec | MV1 |
| SECOND TIME | 200msec | MV2 |
| THIRD TIME | 300msec | MV3 |
| ... | ... | ... |

CONTROL DEVICE, CONVEYANCE DEVICE, ELECTRIC CYLINDER, AND STORAGE MEDIUM

CROSS-REFERENCE TO RELATED APPLICATION(S)

This application is a Continuation of International Patent Application No. PCT/JP2021/005007, filed Feb. 10, 2021, which claims the benefit of International Patent Application No. PCT/JP2020/009469, filed Mar. 5, 2020, both of which are hereby incorporated by reference herein in their entirety.

BACKGROUND OF THE INVENTION

Field of the Invention

The present invention relates to a motor control technique.

Description of the Related Art

There are proposed robots such as an electric cylinder using a motor as a drive source (for example, Japanese Patent No. 4531079, Japanese Patent Laid-Open No. 2000-60182, Japanese Patent No. 5268096). Among such robots, there is also proposed a robot with a motor control circuit incorporated in a part thereof (for example, Japanese Patent No. 5268096). To control the rotation direction of a motor, a motor drive voltage and a signal voltage for instructing the rotation direction of the motor are needed in general. If the motor drive voltage and the signal voltage are different, a host device such as a PLC needs a plurality of types of power supplies, and wirings for the voltages are also necessary. Hence, the system configuration may be complex. Japanese Patent No. 6541827 discloses a control device including two input terminals to which a motor drive voltage is selectively input. The control device discriminates which input terminal receives the drive voltage and sets the rotation direction of a motor.

When controlling a motor, in many cases, not only the rotation direction but also the rotation speed is required to be changed. If a signal voltage for instructing switching of the rotation speed of the motor is separately needed, the system configuration may be complex.

SUMMARY OF THE INVENTION

It is an object of the present invention to control the rotation direction and the rotation speed of a motor by a relatively simple system configuration.

According to an aspect of the present invention, there is provided a control device of a motor, comprising: a first input terminal and a second input terminal to which a DC voltage for driving the motor is input; and a control unit configured to control the motor, wherein the control unit executes first input confirmation processing of confirming first input of the DC voltage to the first input terminal or the second input terminal, rotation direction setting processing of, when the first input to one input terminal of the first input terminal and the second input terminal is confirmed by the first input confirmation processing, setting a rotation direction of the motor based on which input terminal receives the DC voltage, operation processing of operating the motor at a first rotation speed in the rotation direction set by the rotation direction setting processing, second input confirmation processing of confirming second input of the DC voltage to the other input terminal of the first input terminal and the second input terminal, and speed change processing of, when the second input to the other input terminal is confirmed by the second input confirmation processing, changing the rotation speed of the motor from the first rotation speed to a second rotation speed.

Further features of the present invention will become apparent from the following description of exemplary embodiments (with reference to the attached drawings).

DESCRIPTION OF THE EMBODIMENTS

Figure 1:
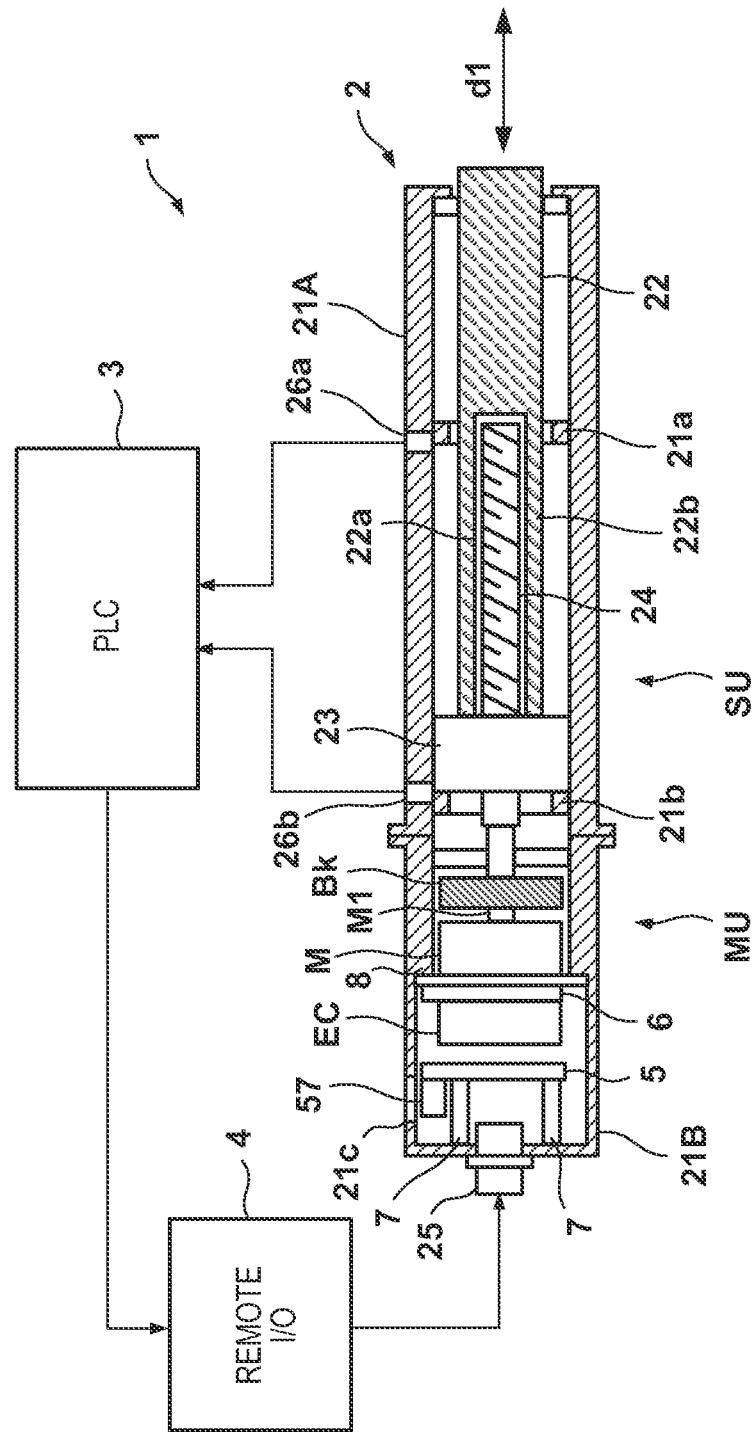
FIG. 1 is an explanatory view of a system configuration.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Configuration of System>

FIG. 1 is an explanatory view of a control system 1 that performs drive control of an electric cylinder 2. The control system 1 includes the electric cylinder 2, a PLC 3 (Programmable Logic Controller), and a remote I/O 4. The PLC 3 controls the electric cylinder 2 via the remote I/O 4. The electric cylinder 2 incorporates a control device 5 and a drive circuit 6 (both will be described later), and the PLC 3 is a host device for the control device 5.

The electric cylinder 2 includes a cylinder unit SU and a motor unit MU. The cylinder unit SU includes a housing 21A, a rod 22, a ball nut 23, and a ball screw shaft 24. The motor unit MU includes a housing 21B, a motor M, an electromagnetic brake Bk, a rotary encoder EC, the control device 5, and the drive circuit 6. The housing 21A is a cylinder body extending in a direction d1, and is connected, at one end portion, to the housing 21B of the motor unit MU. The housing 21A and the housing 21B form one housing as a whole.

One end portion of the housing 21B is closed, and a wiring connecting portion 25 is fixed here. The wiring connecting portion 25 is, for example, a connector to which a wiring (for example, a multicore cable) for connecting the electric cylinder 2 and the remote I/O 4 is detachably connected. The rod 22 is an operation portion that is supported to be movable forward and backward with respect to the housing 21A and is moved forward and backward in the direction of the arrow d1 by the driving force of the motor M of the motor unit MU. The motor M is stored in the housing 21B. In this embodiment, the motor M is a brushless motor, but may be a motor other than a brushless motor.

In this embodiment, the transmission mechanism of the driving force of the motor M to the rod 22 is a ball screw mechanism, but may be a transmission mechanism other than a ball screw mechanism. The ball nut 23 is fixed in the hole 22a (to be described later) provided at one end portion of the rod 22. The ball nut 23 is arranged in the housing 21A such that it can slid in the direction d1 and cannot rotate. In the housing 21A, stoppers 21a and 21b are provided while being apart in the direction d1 and sandwiching the ball nut 23. The stoppers 21a and 21b contact the ball nut 23, thereby regulating the movement of the ball nut 23. That is, the ball nut 23 can slid in the direction d1 between the stopper 21a and the stopper 21b.

The ball screw shaft 24 is connected to an output shaft M1 of the motor M. The output shaft M1 and the ball screw shaft 24 are arranged to be parallel and coaxial, and the ball nut 23 engages with the screw groove of the ball screw shaft 24. At one end portion of the rod 22 (the end portion on a side opposite to the end portion that comes in and out of the housing 21A), the hole 22a configured to avoid interference with the ball screw shaft 24 is formed in the axial direction. The hole 22a is a hole with a closed bottom and can receive the ball screw shaft 24. A cylindrical portion 22b surrounding the hole 22a is a sheath portion that covers the ball screw shaft 24. One end portion of the rod 22 and the ball nut 23 are connected, and these can integrally move.

When the motor M is driven, the ball screw shaft 24 rotates, the ball nut 23 moves in the direction d1, and the rod 22 moves. In accordance with the rotation direction of the motor M, the rod 22 moves in a direction to project from the housing 21A to the outside (to be sometimes referred to as a forward operation) or moves in a direction to be stored in the housing 21A (to be sometimes referred to as a backward operation). At this time, the stopper 21a defines the forward operation limit of the rod 22, and the stopper 21b defines the backward operation limit of the rod 22.

The electromagnetic brake Bk is stored in the housing 21B. The electromagnetic brake Bk is provided to be connected to the vicinity of the distal end of the output shaft M1. At the time of energization, the electromagnetic brake Bk does not contact the output shaft M1 and does not impede the rotation of the output shaft M1 (non-braking state). At the time of non-energization (at the time of power cutoff), the electromagnetic brake Bk contacts the output shaft M1 and completely stops the rotation of the output shaft M1 (braking state). The motor M and the electromagnetic brake Bk are supported by a support portion 8 of the housing 21B.

Also, the control device 5 is stored in the housing 21B. In this embodiment, the control device 5 is a circuit board electrically connected to the drive circuit 6 by a harness (not shown). The control device 5 and the drive circuit 6 can also be formed by one circuit board. However, when these are formed by a plurality of circuit boards, the degree of freedom of arrangement may improve. The control device 5 is supported by a support portion 7 of the housing 21B.

The control device 5 and the drive circuit 6 are arranged such that their board surfaces become parallel, and are also arranged apart from each other in a direction (the direction d1 in this embodiment) orthogonal to the board surfaces. In this embodiment, the housing 21B is configured to be long in the direction d1. When the control device 5 and the drive circuit 6 are arranged apart in the direction d1, necessary electronic circuit components can compactly be stored in the housing 21B.

Limit sensors 26a and 26b serving as detection devices are provided in the electric cylinder 2. The limit sensors 26a and 26b are, for example, mechanical switches. The limit sensor 26a is a sensor configured to detect that the ball nut 23 reaches a position to contact the stopper 21a. The limit sensor 26b is a sensor configured to detect that the ball nut 23 reaches a position to contact the stopper 21b. The limit sensors 26a and 26b are connected to the PLC 3. The PLC 3 can detect the position of the ball nut 23, that is, confirm the operation of the electric cylinder 2.

Figure 2:
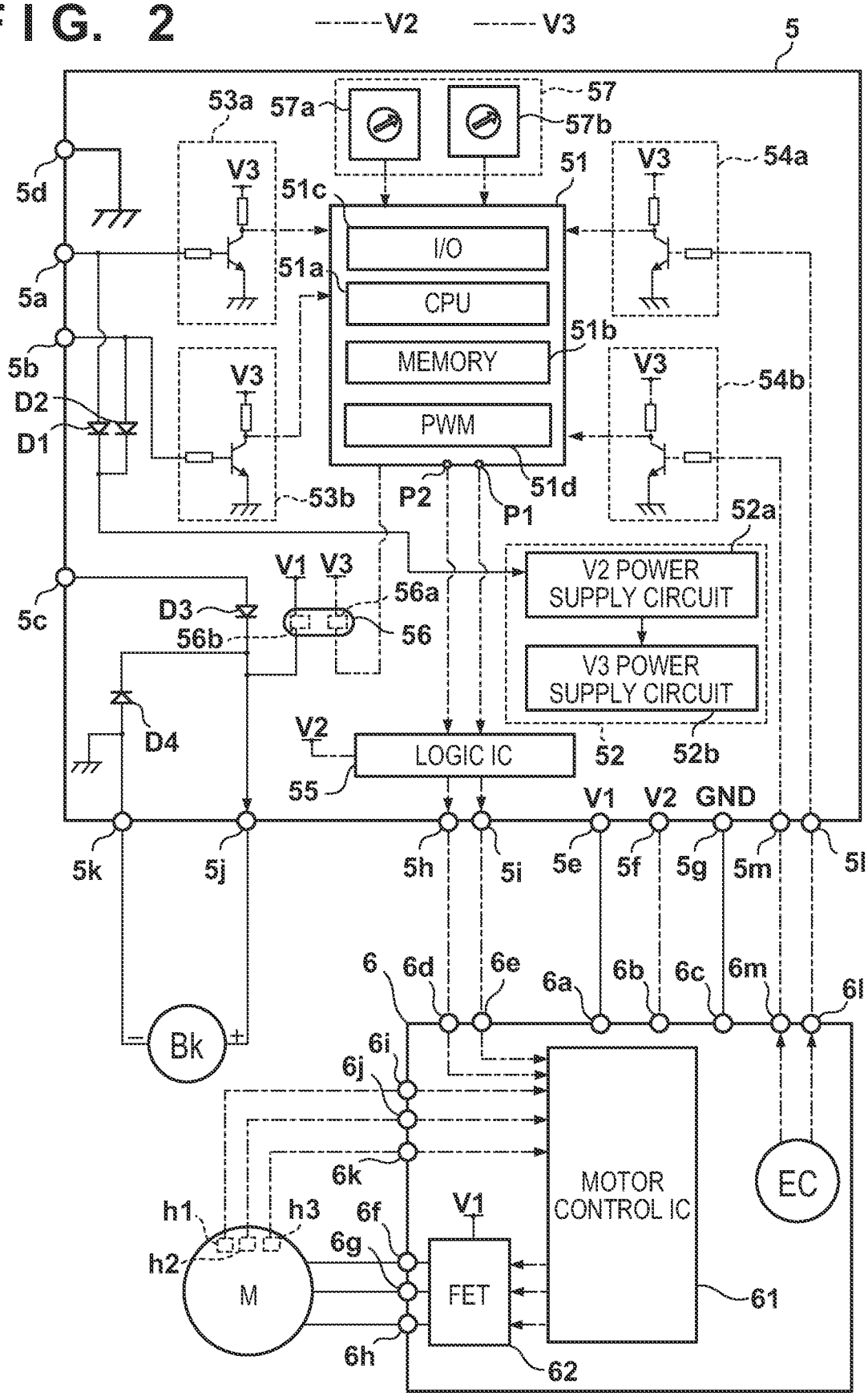
FIG. 2 is a circuit block diagram of a control device and a drive circuit.

The configurations of the control device 5 and the drive circuit 6 will be described with reference to FIG. 2. FIG. 2 is a circuit block diagram of the control device 5 and the drive circuit 6. The control device 5 includes terminals 5a to 5d connected to the wiring connecting portion 25. Hence, wirings between the electric cylinder 2 and the remote I/O 4 include wirings as many as the number of terminals 5a to 5d. The remote I/O 4 is arranged between the PLC 3 and input/output devices (not shown) and relays input signals and output signals between the input/output devices and the PLC 3. Also, the remote I/O 4 supplies control power to the input/output devices and the control device 5. Of the input/output devices, input devices can include various kinds of sensors and an operation switch to be operated by an operator. Output devices can include various kinds of actuators including the electric cylinder 2 and an alarm device (a lamp or a buzzer) in case of abnormality occurrence.

The terminals 5a and 5b are a first input terminal and a second input terminal, which serve as input terminals to which a DC voltage V1 for driving the motor M is input. The voltage V1 is a positive voltage of, for example, DC 24 V output as an output signal from the remote I/O 4. The PLC 3 outputs an output signal for causing the motor M to perform a rotation operation and selects, in accordance with the rotation direction of the motor M as the target of control, a terminal to which the voltage V1 is input first (in other words, selects the output portion of the remote I/O 4). To rotate the motor M in the forward direction (CW), the PLC 3 outputs the output signal from the first output portion of the remote I/O 4, which is connected to the terminal 5a, thereby supplying the voltage V1. To rotate the motor M in the reverse direction (CCW), the PLC 3 outputs the output signal from the second output portion of the remote I/O 4, which is connected to the terminal 5b, thereby supplying the voltage V1. Also, to change the rotation speed of the motor M midway through, the PLC 3 outputs the output signals from both the first output portion and the second output portion of the remote I/O 4, which are connected to the terminal 5a and the terminal 5b, respectively, thereby supplying the voltage V1 to the terminal 5a and the terminal 5b.

More specifically, to change the rotation speed of the motor M midway through, the PLC 3 continuously supplies the voltage V1 to one terminal (for example, the terminal 5a) of the terminal 5a and the terminal 5b, and in this state, continuously supplies the voltage V1 to the other input terminal (for example, the terminal 5b). The timing of changing the rotation speed of the motor M is, for example, the timing at which the PLC 3 detects an input signal for speed change (for example, the input of a speed change sensor (not shown) or the set value of the pulse value of the encoder EC).

The terminal 5c is an input terminal to which a control signal (the voltage at the time of energization is V1) for driving the electromagnetic brake Bk in input. The terminal 5d is a ground terminal to which a common line (GND) is connected. In this embodiment, the terminal 5c and the terminal 5d are connected to the control signal output portion and the ground terminal of the remote I/O 4.

The control device 5 is a circuit in which DC voltages V2 and V3 are used in addition to the DC voltage V1. In this embodiment, the magnitude relationship of these voltages is represented by V1>V2>V3. The voltage V2 is, for example, 5 V, and the voltage V3 is, for example, 3.3 V. In FIG. 2, a wiring for the voltage V1 is indicated by a solid line, a wiring for the voltage V2 is indicated by an alternate long and short dashed line, and a wiring for the voltage V3 is indicated by an alternate long and two short dashed line.

The control device 5 also includes a control circuit 51, a power supply circuit 52, level conversion circuits 53a and 53b, level conversion circuits 54a and 54b, a logic IC 55, a photocoupler 56, and an input unit 57. Also, the control device 5 includes a communication terminal portion (a terminal 5h, a terminal 5i, and a terminal 5l) that communicates an input/output signal for controlling the operation of the motor M with the drive circuit 6, and a motor voltage supply portion (a terminal 5e, a terminal 5f, and a terminal 5g) that supplies the voltage of the operation power supply of the motor M. In addition, the control device 5 includes an external device input/output portion (the terminal 5c, a terminal 5k, and a terminal 5j) connected to an external input/output device.

In this embodiment, the control circuit 51 is a general-purpose microcomputer that operates with the voltage V3, and includes a CPU 51a, a memory 51b, an I/O interface 51c, and a PWM signal generation circuit 51d. The CPU 51 executes a program stored in the memory 51b and controls drive of the motor M. The memory 51b is, for example, a RAM or a ROM. The program stored in the memory 51b may be distributed by a storage medium such as a CD-ROM, read out by another computer from the storage medium, and downloaded to the memory 51b. The PWM signal generation circuit 51d is a circuit that generates a PWM signal for driving the motor M, and is, for example, a programmable counter timer.

The terminal 5a is connected to one of a plurality of input ports of the control circuit 51 via the level conversion circuit 53a, and the terminal 5b is connected to another input port via the level conversion circuit 53b. These input ports are ports to which the power supply voltage for the operation of the control circuit 51, the power supply voltage for the operation of the motor M, and a voltage for a signal for setting change of the rotation direction or the rotation speed of the motor M are input.

The voltage level input to the terminals 5a and 5b is V1, and the operating voltage level of the control circuit 51 is V3. The level conversion circuit 53a is provided between the terminal 5a and the control circuit 51, and the level conversion circuit 53b is provided between the terminal 5b and the control circuit 51. The level conversion circuits 53a and 53b convert the voltage V1 into a signal of a voltage level that can be input to the control circuit 51. In this embodiment, the level conversion circuits 53a and 53b convert the voltage level from the voltage V1 to the voltage V3. Note that if the voltage level input to the terminals 5a and 5b equals the operating voltage level of the control circuit 51, the level conversion circuits 53a and 53b are unnecessary.

In this embodiment, the level conversion circuit 53a is a circuit using a transistor as a switching element. The terminal 5a is connected to the base of the transistor via a resistor, and the voltage V3 is applied to the collector via a resistor. If a voltage of 0 V is input to the terminal 5a, the transistor is turned off, and the voltage V3 is input to the corresponding input port of the control circuit 51. If the voltage V1 is input to the terminal 5a, the transistor is turned on, and a voltage of 0 V is input to the corresponding input port of the control circuit 51.

The level conversion circuit 53b has a similar configuration. If a voltage of 0 V is input to the terminal 5b, the transistor is turned off, and the voltage V3 is input to the corresponding input port of the control circuit 51. If the voltage V1 is input to the terminal 5b, the transistor is turned on, and a voltage of 0 V is input to the corresponding input port of the control circuit 51.

As already described, the PLC 3 supplies the voltage V1 to the terminal 5a or the terminal 5b first in accordance with the rotation direction of the motor M as the control target. Based on which one of the terminal 5a and the terminal 5b receives the voltage V1, the control circuit 51 sets the rotation direction of the motor M and outputs a control signal indicating the rotation direction from an output port P1. The input of the voltage V1 to the terminal 5a or the terminal 5b is enabled when continued for a predetermined time.

The logic IC 55 is an IC that operates with the voltage V2, and includes a plurality of types of logic circuits. The logic IC 55 converts the voltage level of the signal output from the output port P1 from the voltage V3 to the voltage V2 and outputs it to the terminal 5i. This is because the operating voltage of a motor control IC 61 to be described later is V2, but this contributes to stabilizing the output voltage.

The power supply circuit 52 is a circuit configured to generate a power supply voltage of the control device 5 from the voltage V1 input to the terminal 5a or the terminal 5b. In this embodiment, power supply voltages of the control device 5 are V2 and V3, and the power supply circuit 52 includes a power supply circuit 52a that generates the voltage V2, and the power supply circuit 52b that generates the voltage V3.

The terminals 5a and 5b are connected to the power supply circuit 52a via blocking diodes D1 and D2, and the power supply circuit 52a steps down the voltage V1 to generate the voltage V2. The power supply circuit 52b steps down the voltage V2 output from the power supply circuit 52a to generate the voltage V3. Thus, in this embodiment, if the voltage V1 is continuously supplied to one of the terminal 5a and the terminal 5b, the power supply voltage of the control device 5 can be ensured.

If the voltage V1 is input to one of the terminal 5a and the terminal 5b, the control circuit 51 outputs a PWM signal from an output port P2. The voltage level of the PWM signal output from the output port P2 is converted by the logic IC 55 from the voltage V3 to the voltage V2, and the signal is output to the terminal 5h. As already described, to change the rotation speed of the motor M midway through, the PLC 3 supplies the voltage V1 to both the terminal 5a and the terminal 5b. The control circuit 51 changes the setting of the duty ratio of the PWM signal of the PWM signal generation circuit 51d, thereby changing the rotation speed of the motor M.

Based on the input result to the input unit 57, the control circuit 51 sets or changes the duty ratio of the PWM signal. The input unit 57 is a unit capable of adjusting the rotation speed of the motor M, and includes a switch 57a serving as a setting unit configured to adjust the rotation speed of the motor M at the start of drive, and a switch 57b serving as a setting unit configured to adjust the rotation speed of the motor M at the time of change setting of the rotation speed. By the switches 57a and 57b, the first moving speed and the later moving speed of the rod 22 can be adjusted independently.

In this embodiment, the switches 57a and 57b are rotary switches to which the voltage V3 is supplied, and can select one speed from a plurality of types of speeds by switching contacts. As shown in FIG. 1, the housing 21B includes an opening portion 21c configured to expose the input unit 57 to the outside, and the operator can switch the contacts of the switches 57a and 57b via the opening portion 21c. Note that the switches 57a and 57b are not limited to rotary switches and may be other switches such as Dip switches.

Note that in this embodiment, a physical input device such as a changeover switch is employed. However, speed setting may be done by providing, in the memory 51b, a speed setting storage portion serving as a storage area of a speed setting value and storing the speed setting value. A plurality of speed setting storage portions may be provided to enable a plurality of speed settings and change the speed of the motor M. In this method, the input unit 57 may be omitted. Also, the input unit 57 and the speed setting storage portion may be used together. When these are used together, for example, the setting by the input unit 57 may be set as a reference speed, and this may be converted into a speed in the speed setting storage portion.

Output signals (for example, signals with a phase difference) of the rotary encoder EC are input to the level conversion circuits 54a and 54b via terminals 6l and 6m of the drive circuit 6 and the terminals 5l and 5m of the control device 5. In this embodiment, the operating voltage of the rotary encoder EC is V2, and the operating voltage level of the control circuit 51 is V3. The level conversion circuit 54a is provided between the terminal 5l and the control circuit 51, and the level conversion circuit 54b is provided between the terminal 5m and the control circuit 51. The level conversion circuits 54a and 54b convert the voltage V2 into a signal of a voltage level that can be input to the control circuit 51. In this embodiment, the level conversion circuits 54a and 54b convert the voltage level from the voltage V2 to the voltage V3. Note that if the voltage level of the output signal of the rotary encoder EC equals the operating voltage level of the control circuit 51, the level conversion circuits 54a and 54b are unnecessary.

In this embodiment, the level conversion circuit 54a is a circuit using a transistor as a switching element. The terminal 5l is connected to the base of the transistor via a resistor, and the voltage V3 is applied to the collector via a resistor. If a voltage of 0 V is input to the terminal 5l, the transistor is turned off, and the voltage V3 is input to the corresponding input port of the control circuit 51. If the voltage V2 is input to the terminal 5l, the transistor is turned on, and a voltage of 0 V is input to the corresponding input port of the control circuit 51.

The level conversion circuit 54b has a similar configuration. If a voltage of 0 V is input to the terminal 5m, the transistor is turned off, and the voltage V3 is input to the corresponding input port of the control circuit 51. If the voltage V2 is input to the terminal 5m, the transistor is turned on, and a voltage of 0 V is input to the corresponding input port of the control circuit 51.

The control circuit 51 can discriminate, based on the output signal of the rotary encoder EC, whether the motor M is rotating.

The control device 5 includes the terminals 5j and 5k to which the electromagnetic brake Bk (a device connected to the external output portion) is connected. The terminal 5j connected to the +side of the electromagnetic brake Bk is connected to the terminal 5c via a diode D3. The drive voltage of the electromagnetic brake Bk is V1. In maintenance or the like, the voltage V1 is input from the PLC 3 to the terminal 5c, thereby operating the electromagnetic brake Bk. The terminal 5k connected to the +side of the electromagnetic brake Bk is connected to GND and is also connected to the terminal 5j via a diode D4 to suppress a counter electromotive force that is generated when the electromagnetic brake Bk switches from ON to OFF.

Also, the output of a light-receiving element 56b of the photocoupler 56 can be input to the terminal 5j. The photocoupler 56 includes a light-emitting element 56a such as a light-emitting diode, and the light-receiving element 56b such as a photo transistor or a photo MOSFET. The voltage V3 is applied to the light-emitting element 56a. The light emission can be on/off-controlled by switching High and Low of a port provided in the control circuit 51. The voltage V1 is applied to the light-receiving element 56b. When the light-emitting element 56a emits light, the voltage V1 is input to the electromagnetic brake Bk via the terminal 5j. To stop the motor M, the control circuit 51 turns off the light-emitting element 56a, thereby setting the electromagnetic brake Bk in the braking state. At the same time, the control circuit 51 stops output of the PWM signal, thereby instantaneously stopping the movement of the rod 22 and holding the stop state.

Note that in this embodiment, the electromagnetic brake Bk is employed as the brake. However, a mechanical brake mechanism may be provided in place of the electromagnetic brake Bk.

The drive circuit 6 will be described next. The drive circuit 6 is a circuit in which the voltage V1 and the voltage V2 are used. The drive circuit 6 includes terminals 6a to 6c. The terminals 6a to 6c are connected to the terminals 5e to 5g of the control device 5, respectively, and supply of the voltage V1, supply of the voltage V2, and connection of GND are done. The voltage V2 input to the terminal 6b is supplied to the rotary encoder EC and the motor control IC 61 to operate these. The voltage V1 input to the terminal 6a is supplied to an FET 62 to operate the FET 62.

The drive circuit 6 includes terminals 6e and 6d. A control signal indicating the rotation direction of the motor M is input to the terminal 6e via the terminal 5i, and the control signal is input to the motor control IC 61. A PWM signal is input to the terminal 6d via the terminal 5h, and the PWM signal is input to the motor control IC 61.

The drive circuit 6 includes terminals 6i to 6k. Hall elements h1 to h3 of the motor M are connected to the terminals 6i to 6k, and signals from the Hall elements are input to the motor control IC 61. Note that the drive voltage of the voltage V2 is supplied from the drive circuit 6 to the Hall elements h1 to h3. The drive circuit 6 includes terminals 6f to 6h. The terminals 6f to 6h are connected to the motor windings of the motor M.

The motor control IC 61 and the FET 62 are circuits configured to drive the motor M. Based on the control signal indicating the rotation direction of the motor M and the PWM signal from the control circuit 51 and the signals from the Hall elements h1 to h3, the motor control IC 61 generates a switching signal for the FET 62 configured to switch energization of each phase of the motor M and outputs the switching signal to the FET 62 (voltage V2). The FET 62 supplies the voltage V1 for each phase by the switching signal, and the motor M thus rotates.

Example of Operation of System

An example of the operation of the system 1 will be described next. The operator sets the rotation speed at the start of drive of the motor M and that at the change setting of the rotation speed (in other words, the moving speeds of the rod 22) in advance by the switches 57a and 57b. After that, the operation of the PLC 3 is started. Here, assume a case in which the PLC 3 is programmed such that the voltage V1 is input to the terminal 5a (no voltage is input to the terminal 5b) to rotate the motor M in the forward direction, and the voltage V1 is input to the terminal 5b (no voltage is input to the terminal 5a) to rotate the motor M in the reverse direction. Also, assume a case in which if the motor M rotates in the forward direction, the rod 22 performs the forward operation, and if the motor M rotates in the reverse direction, the rod 22 performs the reverse rotation operation.

A case in which the motor M is rotated in the forward direction will be described first. The PLC 3 supplies the voltage V1 to the terminal 5a. More specifically, the processor of the PLC 3 executes the program stored in the storage device of the PLC 3, designates the output portion of the remote I/O 4, and instructs output of an output signal. When the remote I/O 4 continuously outputs the output signal in response to the instruction, the voltage V1 is supplied to the terminal 5a connected to the output portion of the remote I/O 4. If the voltage V1 is input to the terminal 5a, the voltages V2 and V3 which are necessary for the control device 5 are ensured by the power supply circuit 52, and the CPU 51a of the control circuit 51 executes the program stored in the memory 51b.

In addition, the CPU 51a acquires the states of the input ports corresponding to the terminals 5a and 5b, recognizes that the voltage V1 is continuously input to the terminal 5a, and sets the rotation direction of the motor M to the forward direction. The CPU 51a acquires the state of the input port corresponding to the switch 57a and sets the duty ratio of the PWM signal. The CPU 51a causes the control circuit to output the control signal indicating the rotation direction of the motor M and the PWM signal. Also, the CPU 51a starts monitoring the output signal of the rotary encoder EC. Furthermore, after the elapse of a predetermined time (for example, 100 msec) from the start of output of the PWM signal, the CPU 51a causes the light-emitting element 56a to emit light and sets the electromagnetic brake Bk in a non-braking state.

The motor control IC 61 starts driving the motor M based on the control signal and the PWM signal from the control circuit 51. By driving the motor M, the rod 22 starts the forward operation. When the PLC 3 supplies the voltage V1 to the terminal 5b as well midway through the forward operation (in the state in which the voltage V1 is continuously supplied to the terminal 5a), the rotation speed of the motor M is changed. The CPU 51a acquires the state of the input port corresponding to the switch 57b and sets the duty ratio of the PWM signal. This changes the rotation speed of the motor M (the forward speed of the rod 22).

When the ball nut 23 moves to the position to contact the stopper 21a, the motor M cannot rotate. If the output signal of the rotary encoder EC does not change for a predetermined time, the CPU 51a considers that the ball nut 23 contacts the stopper 21a, and stops output of the control signal and the PWM signal, thereby stopping the rotation of the motor M. In addition, the CPU 51a turns off the light-emitting element 56a and sets the electromagnetic brake Bk in the braking state, thereby reliably stopping the rotation of the motor M (output shaft M1).

The movement of the ball nut 23 to the position to contact the stopper 21a is detected by the limit sensor 26a as well, and the PLC 3 recognizes this based on the output signal of the limit sensor 26a. After the elapse of a predetermined time (for example, after the elapse of a time needed for the CPU 51a to execute processing of turning off the light-emitting element 56a, setting the electromagnetic brake Bk in the braking state, and after the elapse of a predetermined time (for example, 10 msec after), stopping the PWM output signal), the PLC 3 stops input of the voltage V1 to the terminals 5a and 5b.

A case in which the motor M is rotated in the reverse direction will be described next. This is basically the same as the case in which the motor M is rotated in the forward direction.

The PLC 3 supplies the voltage V1 to the terminal 5b. More specifically, the processor of the PLC 3 executes the program stored in the storage device of the PLC 3, designates the output portion of the remote I/O 4, and instructs output of an output signal. When the remote I/O 4 continuously outputs the output signal in response to the instruction, the voltage V1 is supplied to the terminal 5a connected to the output portion of the remote I/O 4. If the voltage V1 is input to the terminal 5b, the voltages V2 and V3 which are necessary for the control device 5 are ensured by the power supply circuit 52, and the CPU 51a of the control circuit 51 executes the program stored in the memory 51b.

In addition, the CPU 51a acquires the states of the input ports corresponding to the terminals 5a and 5b, recognizes that the voltage V1 is continuously input to the terminal 5b, and sets the rotation direction of the motor M to the reverse direction. The CPU 51a acquires the state of the input port corresponding to the switch 57b and sets the duty ratio of the PWM signal. The CPU 51a causes the control circuit to output the control signal indicating the rotation direction of the motor M and the PWM signal. Also, the CPU 51a starts monitoring the output signal of the rotary encoder EC. Furthermore, after the elapse of a predetermined time (for example, 100 msec) from the start of output of the PWM signal, the CPU 51a causes the light-emitting element 56a to emit light and sets the electromagnetic brake Bk in a non-braking state.

The motor control IC 61 starts driving the motor M based on the control signal and the PWM signal from the control circuit 51. By driving the motor M, the rod 22 starts the backward operation. When the PLC 3 supplies the voltage V1 to the terminal 5a as well midway through the backward operation (in the state in which the voltage V1 is continuously supplied to the terminal 5b), the rotation speed of the motor M is changed. The CPU 51a acquires the state of the input port corresponding to the switch 57b and sets the duty ratio of the PWM signal. This changes the rotation speed of the motor M (the backward speed of the rod 22).

When the ball nut 23 moves to the position to contact the stopper 21b, the motor M cannot rotate. If the output signal of the rotary encoder EC does not change for a predetermined time, the CPU 51a considers that the ball nut 23 contacts the stopper 21b, turns off the light-emitting element 56a, sets the electromagnetic brake Bk in the braking state, and stops output of the control signal and the PWM signal, thereby reliably stopping the rotation of the motor M (output shaft M1).

The movement of the ball nut 23 to the position to contact the stopper 21b is detected by the limit sensor 26b as well, and the PLC 3 recognizes this based on the output signal of the limit sensor 26b. After the elapse of a predetermined time, the PLC 3 stops input of the voltage V1 to the terminal 5b. With the above-described processing, the forward operation and the backward operation of the electric cylinder 2 can repetitively be performed.

As for the stop of the movement of the ball nut 23, the ball nut 23 stops not only upon contacting the stopper 21a or 21b provided in the moving direction of the ball nut 23 but also due to a failure of the motor or interference with an obstacle. These stops can be detected by combining monitoring of the operation time of the motor M or the ball nut 23, monitoring of the output signal of the rotary encoder EC, and monitoring of the detection states of the limit sensors 26a and 26b.

Example of Processing of Control Device

Figure 3:
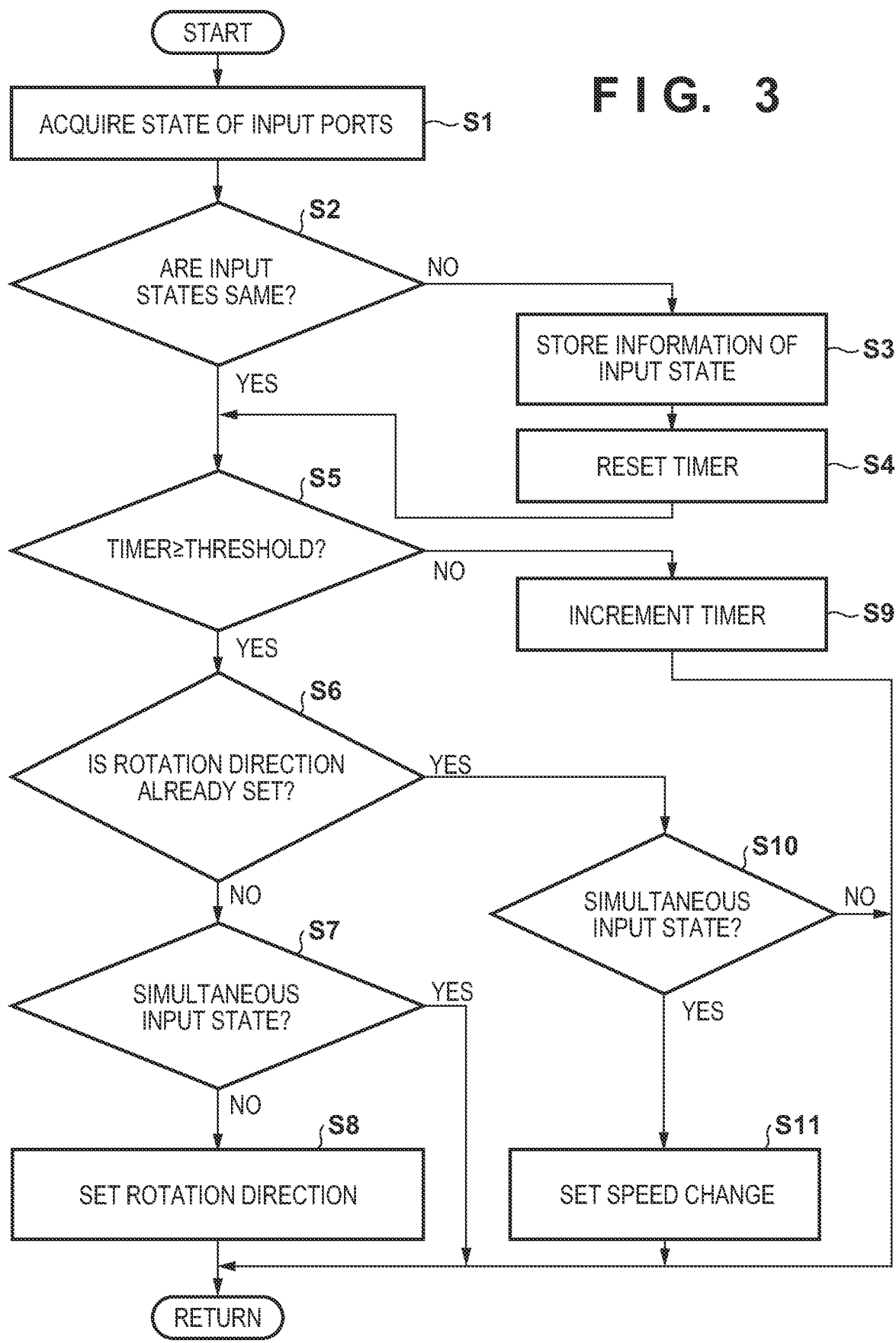
FIG. 3 is a flowchart showing an example of processing of the control device.
Figure 4:
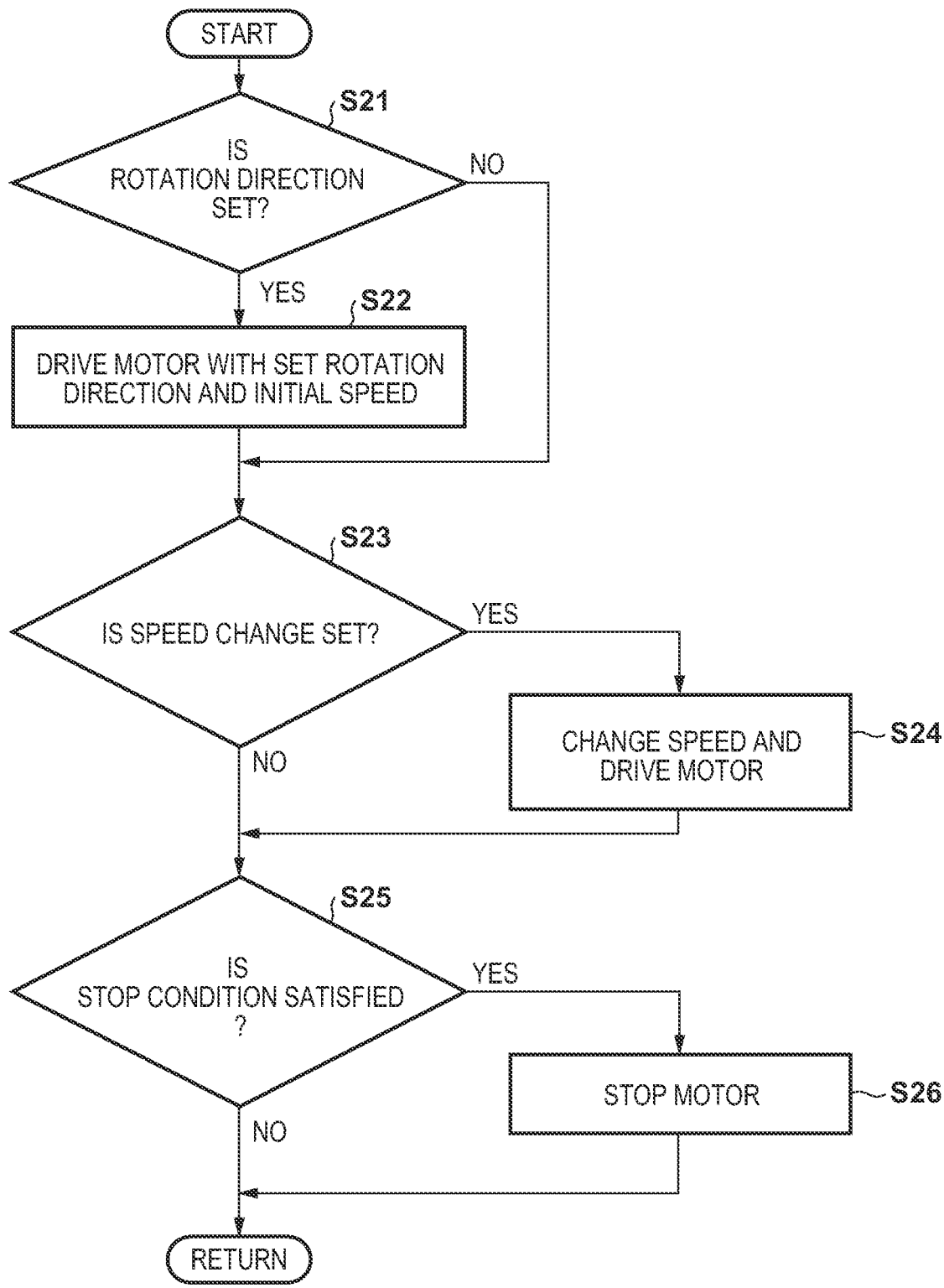
FIG. 4 is a flowchart showing an example of processing of the control device.

An example of processing of the CPU 51a in the above-described operation example of the system 1 will be described with reference to FIGS. 3 and 4. FIGS. 3 and 4 are flowcharts of the program stored in the memory 51b, and the CPU 51a repetitively executes the processes shown in FIGS. 3 and 4 at a predetermined period. FIG. 3 shows input confirmation processing of the terminals 5a and 5b, rotation direction setting processing, and rotation speed change processing. FIG. 4 shows operation processing of the motor M.

When the voltage V1 is supplied to at least one of the terminal 5a and the terminal 5b, the power supply circuit 52 then ensures the power supply voltages V2 and V3 necessary for the control device 5, and the CPU 51a is activated. After the activation processing, the CPU 51a starts the processing shown in FIG. 3.

In step S1, the state of the input ports corresponding to the terminal 5a and the terminal 5b is acquired. The state of the input ports (to be referred to as a port input state hereinafter) of the terminal 5a/terminal 5b is one of three patterns ON/OFF, OFF/ON, and ON/ON. In step S2, it is determined whether the port input state acquired in step S1 is the same as the port input state acquired in the previous processing in FIG. 3. The port input state in the previous processing is stored in the memory 51b and updated in step S3 to be described later. If the port input states are the same, the process advances to step S5. If the port input states are not the same, the process advances to step S3. In the processing of first time, the process advances to step S3.

In step S3, the information of the port input state acquired in step S1 is stored in the memory 51b. This information is used for determination in step S2, as described above. In step S4, the value of a timer is reset. This timer is a timer configured to count the time during which the same port input state continues.

In step S5, it is determined whether the timer is equal to or more than a threshold. That the timer is equal to or more than a threshold means that the same port input state has continued for a predetermined time. In this embodiment, if the same port input state is continuing for a predetermined time, it is considered that the input to the terminal 5a or the terminal 5b is determined. This can improve the chattering resistance or noise immunity of the input signal. The determined contents represent the port input state stored in the memory 51b. The threshold is a value corresponding to, for example, 10 msec. Upon determining that the timer is equal to or more than the threshold, the process advances to step S7. Upon determining that the timer is less than the threshold, the process advances to step S9. In step S9, the timer is incremented, and the processing is ended.

In step S6, it is determined whether the rotation direction of the motor M is already set. The setting information of the rotation direction is stored in the memory 51b. If the rotation direction is not set yet, the process advances to step S7. If the rotation direction is already set, the process advances to step S10. In step S7, it is determined whether the port input state determined in step S5 is terminal 5a/terminal 5b=ON/ON. That is, it is determined whether the voltage V1 is simultaneously input to the terminal 5a and the terminal 5b. If terminal 5a/terminal 5b=ON/ON, the instruction of the rotation direction from the PLC 3 cannot be discriminated at the stage of setting the rotation direction of the motor M, and the processing is ended. If terminal 5a/terminal 5b=ON/OFF or terminal 5a/terminal 5b=OFF/ON, the process advances to step S8.

In step S8, the rotation direction of the motor M is set. If the port input state determined in step S5 is terminal 5a/terminal 5b=ON/OFF, the rotation direction of the motor M is set to the forward direction (CW). If the port input state determined in step S5 is terminal 5a/terminal 5b=OFF/ON, the rotation direction of the motor M is set to the reverse direction (CCW). When the rotation direction is set, drive of the motor M is started. After that, the processing is ended.

In step S10, it is determined whether the port input state determined in step S5 is terminal 5a/terminal 5b=ON/ON. This is the same processing as in step S7. If terminal 5a/terminal 5b=ON/ON, the process advances to step S11. If terminal 5a/terminal 5b≠ON/ON, the processing is ended (speed change is not performed). In step S11, the rotation speed of the motor M is changed from the initial rotation speed (the set speed of the switch 57a) at the start of drive to the rotation speed (the set speed of the switch 57b) at the time of change setting. The processing is thus ended.

Referring to FIG. 4, in step S21, it is determined whether the rotation direction is set from an unset state. If the rotation direction is set, the process advances to step S22. If the rotation direction is not set or is already set, the process advances to step S23. In step S22, drive of the motor M is started. The rotation direction of the motor M complies with the setting, and the rotation speed is set to the initial rotation speed (the set speed of the switch 57a, normal rotation speed) at the start of drive. The PWM signal generation circuit 51d outputs the PWM signal. The electromagnetic brake Bk is set in the non-braking state.

In step S23, it is determined whether rotation speed change is set from an unset state. If rotation speed change is set, the process advances to step S24. If rotation speed change is not set or is already set, the process advances to step S25. In step S24, the rotation speed of the motor M is changed from the initial rotation speed to the rotation speed at the time of change setting. The duty ratio of the PWM signal output from the PWM signal generation circuit 51d is changed.

In step S25, it is determined whether the stop condition of the motor M is satisfied. In this embodiment, if the output signal of the rotary encoder EC does not change for a predetermined time, it is determined that the stop condition is satisfied. Upon determining that the stop condition is satisfied, the process advances to step S26. Upon determining that the stop condition is not satisfied, the processing is ended.

In step S26, output of the control signal and the PWM signal is stopped, and the rotation of the motor M is stopped. In addition, the light-emitting element 56a is turned off, and the electromagnetic brake Bk is set in the braking state, thereby reliably stopping the rotation of the motor M (output shaft M1). The processing is thus ended.

Figure 5:
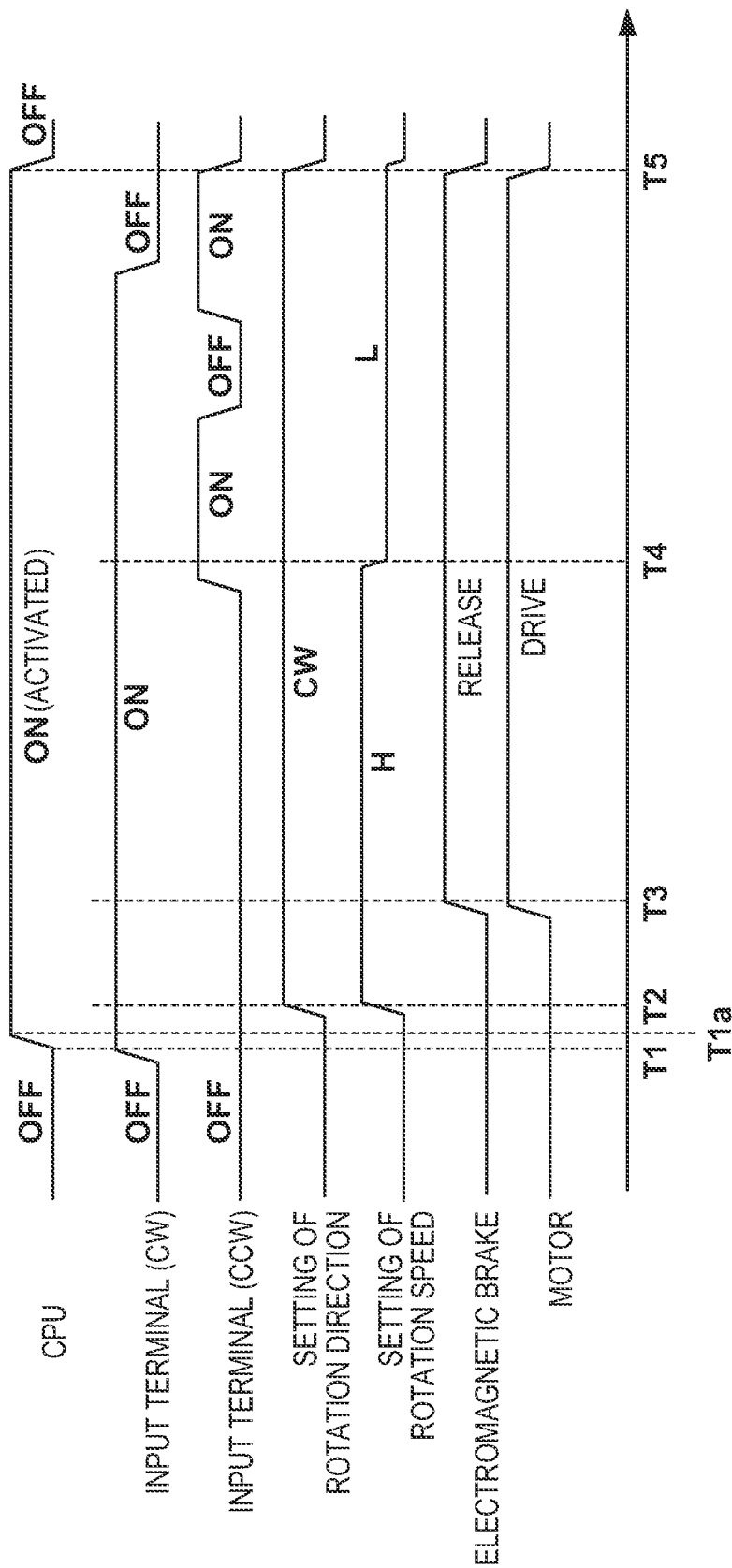
FIG. 5 is a timing chart showing an example of progress of processing of control.

FIG. 5 is a timing chart showing an example of changes of the activation state of the control circuit 51 (the activation state of the CPU 51a), the input terminal 5a (CW), the input terminal 5b (CCW), the setting of the rotation direction of the motor M, the setting of the rotation speed of the motor M, the electromagnetic brake Bk, and the motor M along with the progress of the processing of the control device 5 explained with reference to FIGS. 3 and 4.

At time T1, when a DC voltage is supplied to the input terminal 5a, power is supplied to the control device 5 (in the example shown in FIG. 5, the input terminal 5a is turned on), and the CPU 51a is activated. The voltage is continuously supplied to the input terminal 5a (in the example shown in FIG. 5, the ON state of the input terminal 5a continues), and the activation processing of the CPU 51a is completed (time T1a). At time T2, it is determined that the ON state of the input terminal 5a continues beyond the threshold (for a predetermined time or more) (step S5), and voltage supply to the input terminal 5a is further continued, thereby setting the rotation direction of the motor M to the forward direction (CW) (step S8). Once the rotation direction of the motor M is set, it is not changed until the motor M is stopped (both the inputs to the input terminals 5a and 5b are turned off).

As for the rotation speed of the motor M, the initial rotation speed is H, and the rotation speed after setting change is L (H>L). At time T2, the rotation speed is set to the initial rotation speed H. The initial rotation speed may be a normal speed. The rotation speed can also be changed from a low speed to a high speed. However, when changing the rotation speed from a high speed to a low speed, the acceleration/deceleration time is shorter, and the rotation speed can be changed quickly. All rotation speeds that can be set by the switch 57a may be higher than all rotation speeds that can be set by the switch 57b. In addition, both the initial rotation speed and the rotation speed after setting change may be fixed values, or only one of these may be a settable value. For example, the initial rotation speed may be settable by the switch 57a, and the rotation speed after setting change may be a fixed value lower than all rotation speeds that can be set by the switch 57a.

At time T2, drive of the motor M is started, and energization to the electromagnetic brake Bk is started. The electromagnetic brake Bk needs a predetermined time from the start of energization to the non-braking state. At time T3 a little later than time T2, the electromagnetic brake Bk is set in the non-braking state, and the motor M starts rotating.

At time T4, it is determined that the ON state of the input terminal 5b continues beyond the threshold (step S5), and the rotation speed of the motor M is changed from the initial rotation speed H to the rotation speed L after setting change (step S10). Once the rotation speed of the motor M is changed, it is not changed until the motor M is stopped. After time T4, there is a time zone in which the ON and OFF states of the input terminal 5a (CW) and the input terminal 5b (CCW) are switched. However, this does not change the rotation direction or the rotation speed of the motor M. If the DC voltage V1 is supplied to one of the input terminal 5a (CW) and the input terminal 5b (CCW), the motor M is driven unless the stop condition is satisfied.

After that, the stop condition is satisfied, and at time T5, the motor M is stopped, and the electromagnetic brake Bk is shifted to the braking state by non-energization. When the inputs to the input terminal 5a (CW) and the input terminal 5b (CCW) are turned off, the CPU 51a is shut down (the control device 5 is powered off).

Figure 6:
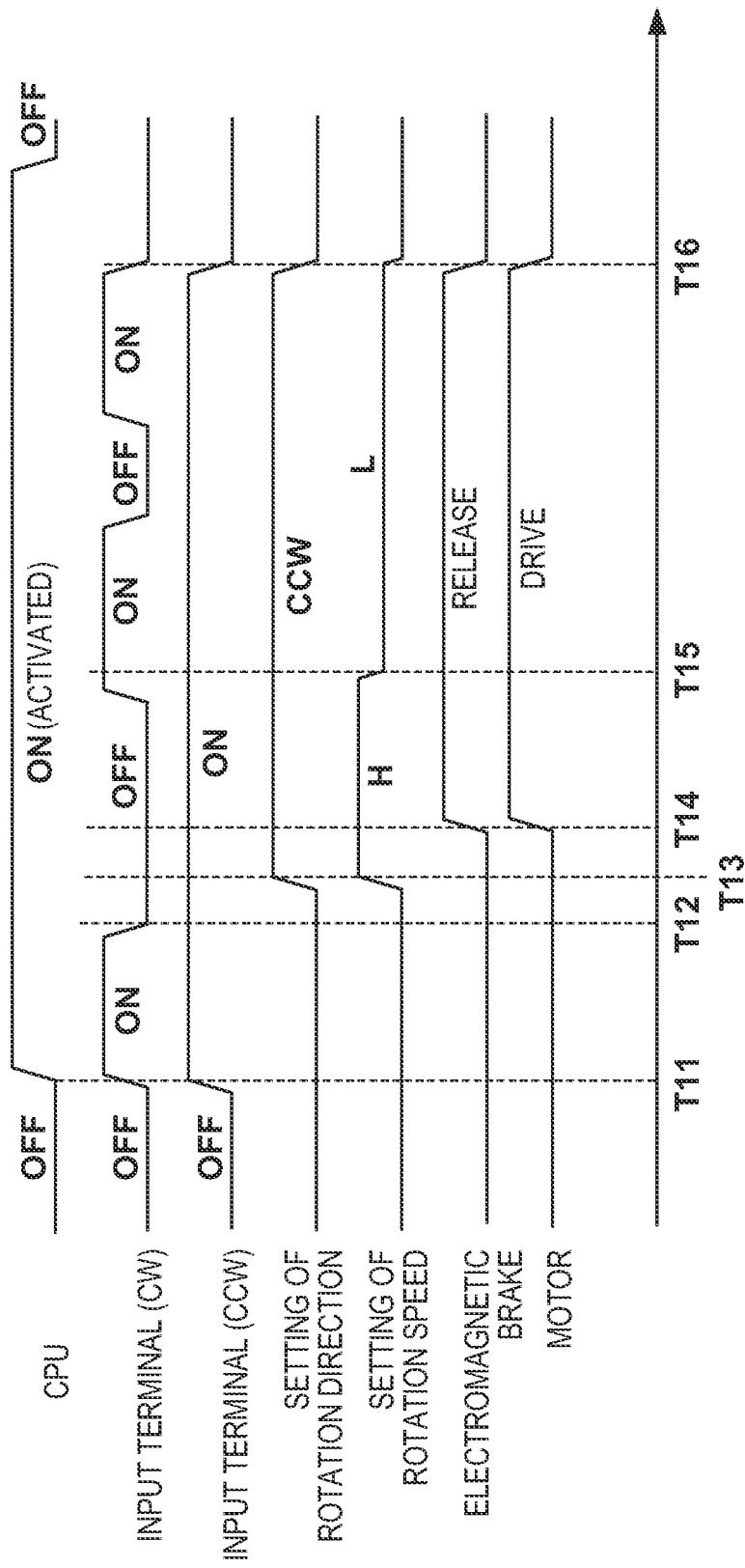
FIG. 6 is a timing chart showing an example of progress of processing of control.

FIG. 6 is a timing chart showing another example. At time T11, both the input terminals 5a and 5b are turned on, and the CPU 51a is activated. During the time when both the input terminals 5a and 5b are ON, the rotation direction of the motor M is not set (step S7). After that, at time T12, the input terminal 5a is turned off. At time T13, it is determined that the ON state of the input terminal 5b continues beyond the threshold (step S5), and the rotation direction of the motor M is set to the reverse direction (CCW) (step S8). As already described above, once the rotation direction of the motor M is set, it is not changed until the motor M is stopped (both the inputs to the input terminals 5a and 5b are turned off).

At time T13, drive of the motor M is started, and energization to the electromagnetic brake Bk is started. The electromagnetic brake Bk needs a predetermined time from the start of energization to the non-braking state. At time T14 a little later than time T13, the electromagnetic brake Bk is set in the non-braking state, and the motor M starts rotating. At time T14, it is determined that the ON state of the input terminal 5a continues beyond the threshold (step S5), and the rotation speed of the motor M is changed from the initial rotation speed H to the rotation speed L after setting change (step S10). As already described above, once the rotation speed of the motor M is changed, it is not changed until the motor M is stopped. After time T14, there is a time zone in which the ON and OFF states of the input terminal 5a (CW) are switched. However, this does not change the rotation direction or the rotation speed of the motor M. If the DC voltage V1 is supplied to one of the input terminal 5a (CW) and the input terminal 5b (CCW), the motor M is driven unless the stop condition is satisfied.

After that, the stop condition is satisfied, and at time T16, the motor M is stopped, and the electromagnetic brake Bk is shifted to the braking state by non-energization.

As described above, in this embodiment, the terminals 5a and 5b of the control device 5 are used as the input terminal of the operating voltage for the control device 5, the input terminal of the drive voltage for the motor M, the input terminal of the rotation direction control signal for the motor M, and the input terminal of the speed change control signal for the motor M. In other words, the drive voltage is also used as the control signals of the rotation direction and the rotation speed of the motor M. Hence, on the side of the PLC 3, it is only necessary to provide the power supply configured to generate the voltage V1. Two wirings suffice for the drive voltage and the control signal between the PLC 3 and the electric cylinder 2. This can, for example, decrease the number of wirings by two as compared to a system including a wiring for the drive voltage, a wiring for forward rotation instruction, a wiring for reverse rotation instruction, and a wiring for rotation speed instruction.

Hence, it is possible to control the rotation direction and the rotation speed of the motor by a relatively simple system configuration. In particular, if the electric cylinder 2 should be introduced into a part of a system that operates by sequence control of a single voltage system of 24 V or the like, the electric cylinder 2 can be introduced without largely changing peripheral equipment.

Second Embodiment

Figure 7:
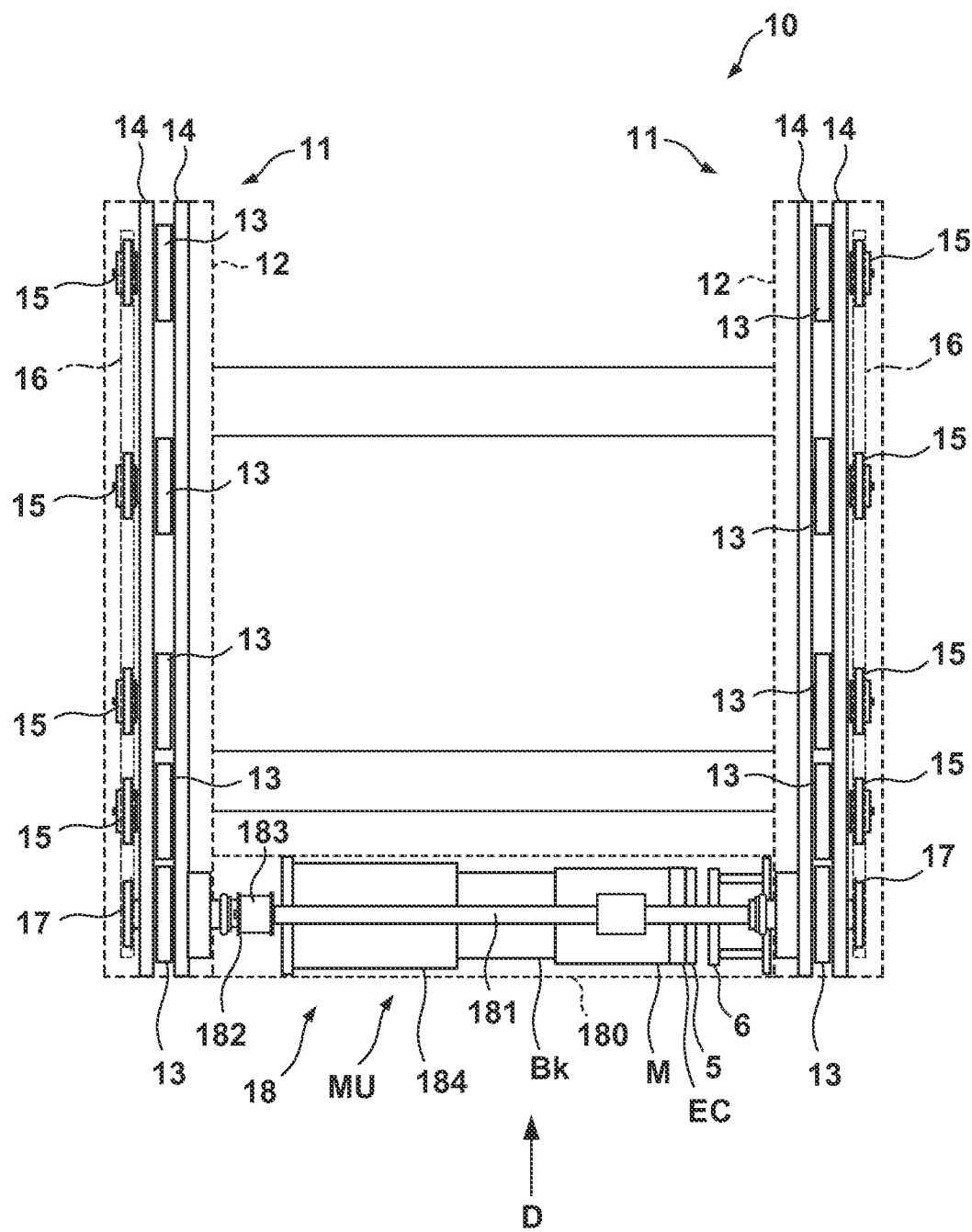
FIG. 7 is an explanatory view of a conveyance device.
Figures 8, 9:
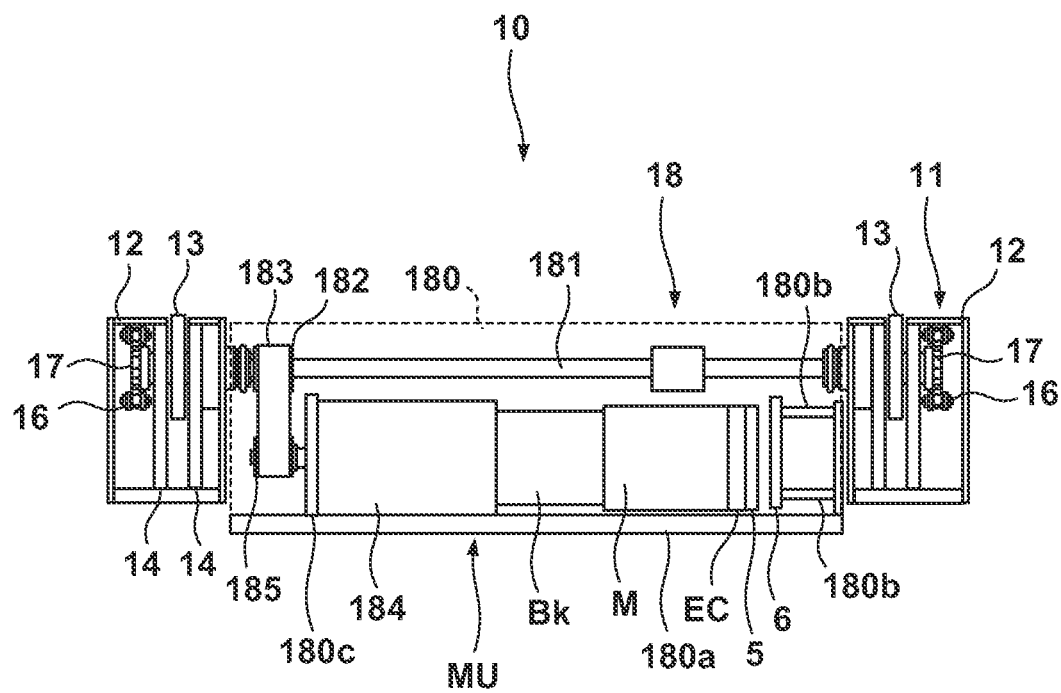
FIG. 8 is an explanatory view of the conveyance device shown in FIG. 7.
FIG. 9 is a view showing an example of information concerning change of the rotation speed of a motor.

The above-described motor unit MU can be applied to various kinds of drive devices other than the electric cylinder. FIGS. 7 and 8 show an example in which a motor unit MU is applied to the drive unit of a conveyance device 10. FIG. 7 is a plan view of the conveyance device 10, and FIG. 8 is a front view of the conveyance device 10 viewed in the direction of an arrow D in FIG. 7. The conveyance device 10 is a roller conveyor formed by two roller units 11 that form a conveyance unit configured to convey a conveyance target object, and a drive unit 18 arranged therebetween.

Each roller unit 11 includes a plurality of rollers 13, and a part (uppermost portion) of each roller 13 projects from a housing 12 to the conveyance surface side. The plurality of rollers 13 form a roller array arranged in a line and are rotatably supported by a pair of support plates 14. Sprockets 15 on a driven side and sprockets 17 on a driving side are attached to the rollers 13. Also, a chain 16 is wound around the sprockets 15 and 17. Hence, along with the rotational drive of the sprocket 17 on the driving side, the sprockets 15 on the driven side are rotationally driven via the chain 16, and all the rollers 13 integrally rotate.

The two roller units 11 are arranged in parallel, and the conveyance target object is placed across the two arrays of the rollers 13. When the rollers 13 rotate, the conveyance target object is conveyed.

The drive unit 18 includes the motor unit MU. The motor unit MU includes a housing 180, and a motor M, a rotary encoder EC, an electromagnetic brake Bk, a speed reducer 184, a control device 5, a drive circuit 6, a drive shaft 181, pulleys 182 and 185, and a belt 183, which are stored in the housing 180.

The motor M, the rotary encoder EC, the electromagnetic brake Bk, the control device 5, and the drive circuit 6 according to this embodiment are the same as the motor M, the rotary encoder EC, the electromagnetic brake Bk, the control device 5, and the drive circuit 6 according to the first embodiment. In this embodiment, an output shaft M1 of the motor M is connected to the speed reducer 184 in place of a ball screw shaft 24. The motor M, the drive circuit 6, the rotary encoder EC, the electromagnetic brake Bk, and the speed reducer 184 are integrally connected.

The housing 180 includes a base plate 180a that forms a bottom portion, and support portions 180b and 180c standing on the base plate 180a. The control device 5 is supported by the support portion 180b. The speed reducer 184 is supported by the support portion 180c. Hence, the motor M, the drive circuit 6, the rotary encoder EC, and the electromagnetic brake Bk are supported by the support portion 18c via the speed reducer 184.

The drive shaft 181 is connected to the sprockets 17 on the driving side in the two roller units 11. The pulley (toothed pulley) 182 is attached to the midway portion of the drive shaft 181. Also, the pulley (toothed pulley) 185 is attached to the output shaft of the speed reducer 184. The belt 183 is wound around the pulley 182 and the pulley 185. When the motor M is driven, the rotation force is output from the speed reducer 184 and transmitted to the drive shaft 181 via the pulley 185, the belt 183, and the pulley 182. Accordingly, the drive shaft 181 rotates, and the rollers 13 of the roller units 11 rotate.

In this embodiment as well, the control device 5 can execute the same processing as the flowchart shown in FIG. 3 or 4. By the processing, the conveyance direction of the conveyance device 10 (the rotation direction of the motor M) and the conveyance speed of the conveyance device 10 (the rotation speed of the motor M) can be controlled.

Third Embodiment

In the first embodiment, the rotation speed of the motor M is switched to two types of speeds. However, the rotation speed may be switched between three or more types of speeds. In this embodiment, the rotation speed of a motor M is changed in accordance with (the length of) the cumulative time of a port input state "terminal 5a/terminal 5b=ON/ON".

FIG. 9 shows an example of information concerning change of the rotation speed of the motor M. This information is stored as setting information in, for example, a memory 51b. The first change condition for the speed of the motor M is that the cumulative time of continuation of the state "terminal 5a/terminal 5b=ON/ON" (the state in which a DC voltage is input to both the terminal 5a and the terminal 5b) reaches 100 msec, and the speed of the motor M after the change is MV1. In the first embodiment, when the rotation direction of the motor M is set (step S8), the motor M starts rotating at the initial rotation speed (a normal speed, and this will be defined as MV0 hereinafter). After that, the port input state changes to terminal 5a/terminal 5b=ON/ON, and when the cumulative time of continuation of this state reaches 100 msec, the rotation speed of the motor M is changed to MV1.

Similarly, the second change condition for the speed of the motor M is that the cumulative time of continuation of the state "terminal 5a/terminal 5b=ON/ON" reaches 200 msec. When this condition is satisfied, the rotation speed of the motor M is changed from MV1 to MV2. The same applies hereafter. In this embodiment, the cumulative time defined by the change condition defines the cumulative time of minimum continuation of the rotation speed of the change source.

In this embodiment, the relationship of the speeds of the motor M is initial rotation speed>MV1>MV2>MV3 . . . , and the speed is reduced in every change. However, the speed may be increased in every change, or one of the reduction and increase of the speed may be performed in every change.

Figure 10:
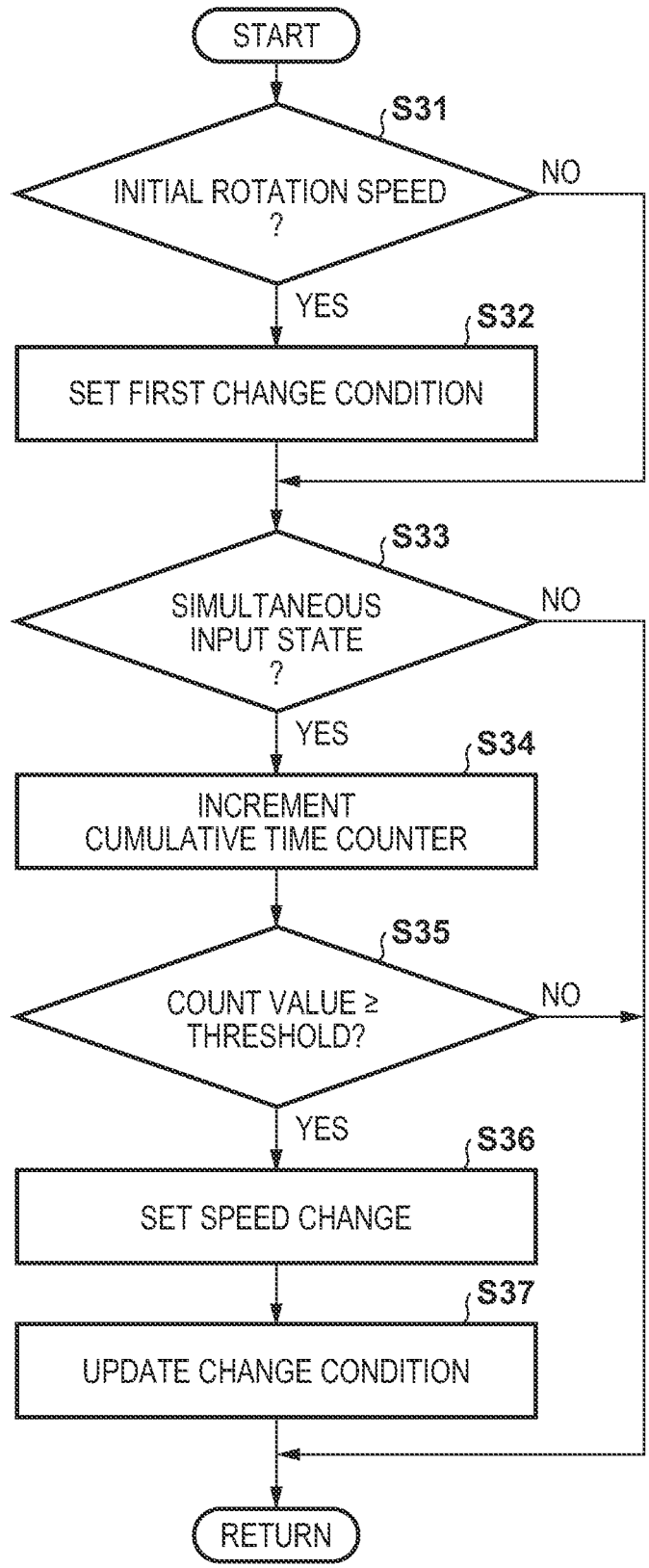
FIG. 10 is a flowchart showing an example of processing of the control device.

FIG. 10 is a flowchart of a program stored in the memory 51b, and shows an example of speed change processing executed by a CPU 51a. The processing shown in FIG. 10 is processing that replaces steps S10 and S11 of FIG. 3 in the first embodiment.

In step S31, it is determined whether the current setting of the rotation speed of the motor M is the initial rotation speed MV0. If the current setting is the initial rotation speed MV0, the process advances to step S32. Otherwise (if the rotation speed is MV1 or the like), the process advances to step S33. In step S32, as the cumulative time serving as the change condition of the rotation speed of the motor M and the speed after the change, the cumulative time as the first change condition and the speed (100 msec and MV1 in the example shown in FIG. 9) are set.

In step S33, it is determined whether the port input state is terminal 5a/terminal 5b=ON/ON. If the port input state is terminal 5a/terminal 5b=ON/ON, the process advances to step S34. Otherwise (ON/OFF, OFF/ON, or OFF/OFF), the processing is ended.

In step S34, the count value (cumulative time) of a cumulative time counter is incremented. The cumulative time counter is a counter configured to count a count value (cumulative time) used to determine whether a change condition is satisfied. In step S35, it is determined whether the count value of the cumulative time counter is equal to or more than a count value set as a threshold. The count value set as a threshold here is the count value as the change condition set in step S32 (or step S37 to be described later). Upon determining that the count value is equal to or more than the count value set as a threshold, the process advances to step S36. Otherwise, the processing is ended.

In step S36, the rotation speed of the motor M is changed to the speed set as the speed after the change in step S32 (or in step S37 to be described later). In step S37, the count value as the change condition of the rotation speed of the motor M and the speed after the change are updated. For example, if the first change is performed in step S36, the count value set as the second change condition and the speed (200 msec and MV2 in the example shown in FIG. 9) are set. Also, for example, if the second change is performed in step S36, the count value set as the third change condition and the speed (300 msec and MV3 in the example shown in FIG. 9) are set. The processing is thus ended.

Figure 11:
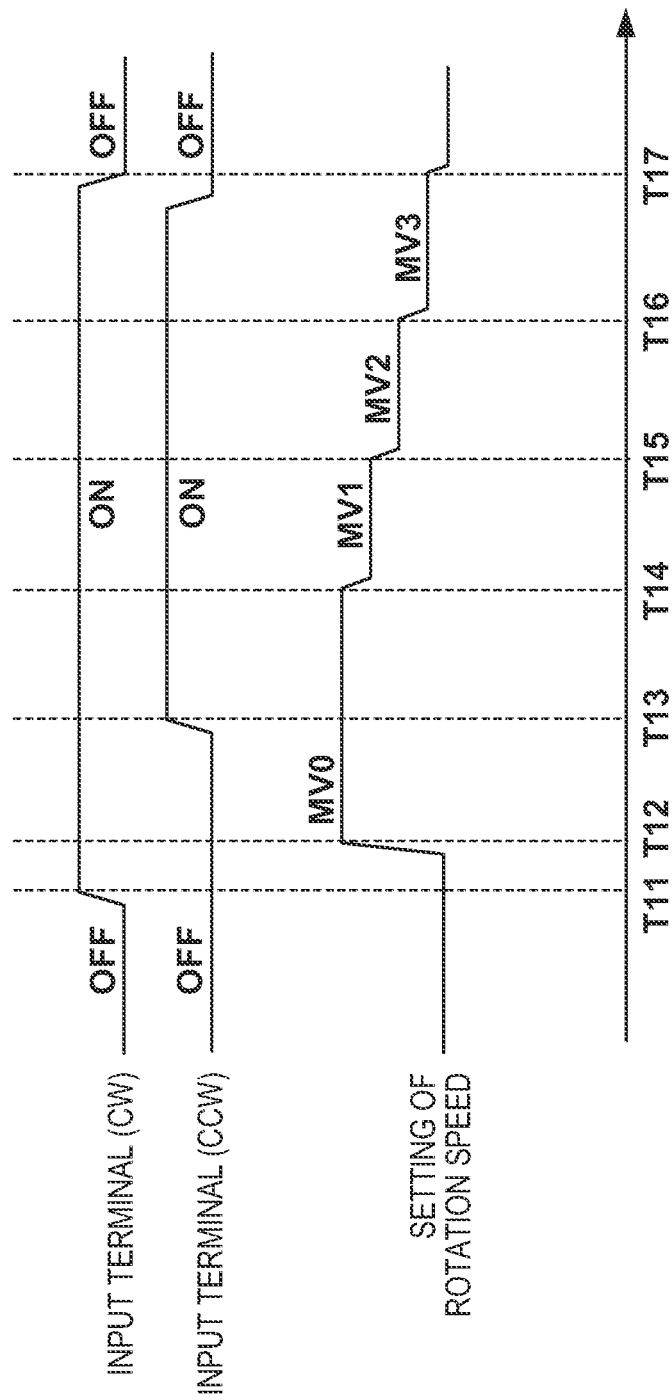
FIG. 11 is a timing chart showing an example of progress of processing of control.

FIG. 11 is a timing chart showing an example of changes of the input terminal 5a (CW), the input terminal 5b (CCW), and the setting of the rotation speed of the motor M along with the progress of processing of a control device 5 explained with reference to FIG. 10.

At time T11, when a DC voltage is supplied to the input terminal 5a, power is supplied to the control device 5 (in the example shown in FIG. 11, the input terminal 5a is turned on), and the CPU 51a is activated. At time T12, it is determined that the ON state of the input terminal 5a continues beyond the count value set as a threshold (for a predetermined time or more), the rotation direction of the motor M is set to the forward direction, and the motor M is driven at the initial rotation speed MV0.

At time T13, a DC voltage is supplied to the input terminal 5b, and both the input terminals 5a and 5b are turned on. At time T14, the state "terminal 5a/terminal 5b=ON/ON" continues for a predetermined time (100 msec in the example shown in FIG. 9), and the rotation speed of the motor M is changed to MV1 (first change).

At time T15, the state "terminal 5a/terminal 5b=ON/ON" continues for a predetermined time (200 msec in the example shown in FIG. 9), and the rotation speed of the motor M is changed to MV2 (second change). At time T16, the state "terminal 5a/terminal 5b=ON/ON" continues for a predetermined time (300 msec in the example shown in FIG. 9), and the rotation speed of the motor M is changed to MV3 (third change).

After that, both the inputs to the input terminal 5a (CW) and the input terminal 5b (CCW) are changed to OFF, and at time T17, the motor M is stopped.

Figure 12:
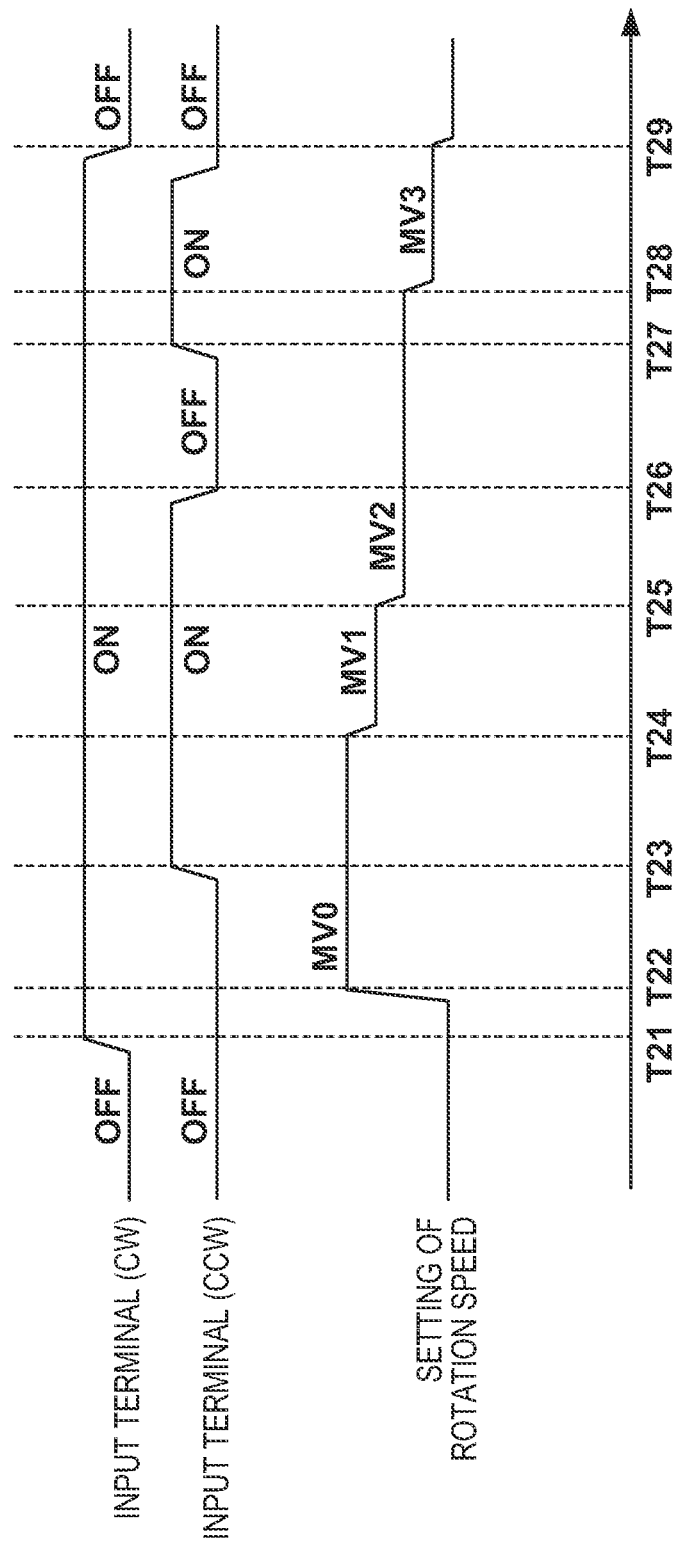
FIG. 12 is a timing chart showing an example of progress of processing of control.

As for the count value (cumulative time) of the cumulative time counter, if terminal 5a/terminal 5b=ON/ON (if the DC voltage is input to both the terminals 5a and 5b), increment is continued (steps S33 and S34). If terminal 5a/terminal 5b=ON/OFF or terminal 5a/terminal 5b=OFF/ON (if the DC voltage is input to one of the terminals 5a and 5b, and the DC voltage is not input to the other of the terminals 5a and 5b), increment is stopped. During the stop of increment of the count value (cumulative time) of the cumulative time counter, the current rotation speed setting is maintained. FIG. 12 is a timing chart showing another example of changes of the input terminal 5a (CW), the input terminal 5b (CCW), and the setting of the rotation speed of the motor M along with the progress of processing of the control device 5 explained with reference to FIG. 10.

At time T21, when a DC voltage is supplied to the input terminal 5a, power is supplied to the control device 5 (in the example shown in FIG. 12, the input terminal 5a is turned on), and the CPU 51a is activated. At time T22, it is determined that the ON state of the input terminal 5a continues beyond the count value set as a threshold (for a predetermined time or more), the rotation direction of the motor M is set to the forward direction, and the motor M is driven at the initial rotation speed MV0.

At time T23, a DC voltage is supplied to the input terminal 5b, and both the input terminals 5a and 5b are turned on. At time T24, the state "terminal 5a/terminal 5b=ON/ON" continues for a predetermined time (100 msec in the example shown in FIG. 9), and the rotation speed of the motor M is changed to MV1 (first change).

At time T25, the state "terminal 5a/terminal 5b=ON/ON" continues for a predetermined time (200 msec in the example shown in FIG. 9), and the rotation speed of the motor M is changed to MV2 (second change). At time T26, the input to the input terminal 5b (CCW) changes to OFF, and increment of the count value (cumulative time) of the cumulative time counter stops. At time T27, the input to the input terminal 5b (CCW) changes to ON again, and increment of the count value (cumulative time) of the cumulative time counter is resumed. At time T28, the cumulative time of the state "terminal 5a/terminal 5b=ON/ON" reaches a predetermined time (300 msec in the example shown in FIG. 9), and the rotation speed of the motor M is changed to MV3 (third change).

After that, both the inputs to the input terminal 5a (CW) and the input terminal 5b (CCW) are changed to OFF, and at time T29, the motor M is stopped.

Although embodiments of the invention are explained above, the invention is not limited to the foregoing embodiments, and various variations/changes are possible within the spirit of the invention.

What is claimed is:

1. A control device of a motor, comprising:
   a first input terminal and a second input terminal to which a DC voltage for driving the motor is input; and
   a control unit configured to control the motor,
   wherein
   the control unit executes:
   first input confirmation processing of confirming first input of the DC voltage to the first input terminal or the second input terminal;
   rotation direction setting processing of, when the first input to one input terminal of the first input terminal and the second input terminal is confirmed by the first input confirmation processing, setting a rotation direction of the motor based on which input terminal receives the DC voltage;
   operation processing of operating the motor at a first rotation speed in the rotation direction set by the rotation direction setting processing;
   second input confirmation processing of confirming second input of the DC voltage to the other input terminal of the first input terminal and the second input terminal; and
   speed change processing of, when the second input to the other input terminal is confirmed by the second input confirmation processing, changing the rotation speed of the motor from the first rotation speed to a second rotation speed;
   wherein in the second input confirmation processing, when an input of a positive voltage to both the first input terminal and the second input terminal is continuing for a predetermined time, it is confirmed that the second input is performed.

2. The control device according to claim 1, wherein the control device further comprises a ground terminal, the DC voltage is applied to the ground terminal and one of the first input terminal and the second input terminal, the first input confirmation processing and the rotation direction setting processing are executed by inputting a positive voltage, and a drive voltage is supplied to the motor during supply of the positive voltage to the first input terminal and/or the second input terminal.

3. The control device according to claim 2, further comprising a drive circuit configured to drive the motor,
wherein the control unit further comprises:
a first output terminal configured to output the DC voltage for drive of the motor to the drive circuit; and
a second output terminal configured to output a control signal to the drive circuit.

4. The control device according to claim 2, wherein
in the first input confirmation processing,
when the input of the positive voltage to one terminal of the first input terminal and the second input terminal is continuing for a predetermined time, it is confirmed that the first input is performed.

5. A conveyance device comprising
a conveyance unit configured to convey a conveyance target object in a conveyance direction, and
a drive unit configured to drive the conveyance unit,
wherein the drive unit includes
a motor;
a control device according to claim 1;
a first support portion configured to support the motor; and
a second support portion configured to support the control device.

6. An electric cylinder including a motor, a rod configured to be moved forward and backward by a driving force of the motor, an electromagnetic brake configured to resist rotation of the motor at the time of non-energization, and a control device according to claim 5 and configured to control the motor, the electric cylinder comprising
a housing configured to internally store the motor, the electromagnetic brake, and the control device and support the rod such that the rod is movable forward and backward,
wherein the housing comprises:
a first support portion configured to support the motor and the electromagnetic brake; and
a second support portion configured to support the control device, and
the control device further comprises a connecting portion to which the electromagnetic brake is connected.

7. A control device of a motor, comprising:
a first input terminal and a second input terminal to which a DC voltage for driving the motor is input; and
a control unit configured to control the motor,
wherein
the control unit executes:
first input confirmation processing of confirming first input of the DC voltage to the first input terminal or the second input terminal;
rotation direction setting processing of, when the first input to one input terminal of the first input terminal and the second input terminal is confirmed by the first input confirmation processing, setting a rotation direction of the motor based on which input terminal receives the DC voltage;
operation processing of operating the motor at a first rotation speed in the rotation direction set by the rotation direction setting processing;
second input confirmation processing of confirming second input of the DC voltage to the other input terminal of the first input terminal and the second input terminal; and
speed change processing of, when the second input to the other input terminal is confirmed by the second input confirmation processing, changing the rotation speed of the motor from the first rotation speed to a second rotation speed,
the control device further comprises a ground terminal,
the DC voltage is applied to the ground terminal and one of the first input terminal and the second input terminal,
the first input confirmation processing and the rotation direction setting processing are executed by inputting a positive voltage,
a drive voltage is supplied to the motor during supply of the positive voltage to the first input terminal and/or the second input terminal,
the control device further comprises an input unit configured to set the first rotation speed,
the motor is a brushless DC motor, and
in the speed change processing, the rotation speed of the motor is changed to the second rotation speed lower than the first rotation speed set by the input unit.

8. A control device of a motor, comprising:
a first input terminal and a second input terminal to which a DC voltage for driving the motor is input; and
a control unit configured to control the motor,
wherein
the control unit executes:
first input confirmation processing of confirming first input of the DC voltage to the first input terminal or the second input terminal;
rotation direction setting processing of, when the first input to one input terminal of the first input terminal and the second input terminal is confirmed by the first input confirmation processing, setting a rotation direction of the motor based on which input terminal receives the DC voltage;
operation processing of operating the motor at a first rotation speed in the rotation direction set by the rotation direction setting processing;
second input confirmation processing of confirming second input of the DC voltage to the other input terminal of the first input terminal and the second input terminal; and
speed change processing of, when the second input to the other input terminal is confirmed by the second input confirmation processing, changing the rotation speed of the motor from the first rotation speed to a second rotation speed,
after the speed change processing, during continuation of the input to one terminal of the first input terminal and the second input terminal, the control unit maintains the rotation speed of the motor at the second rotation speed independently of presence/absence of confirmation of the second input.

9. A control device of a motor, comprising:
a first input terminal and a second input terminal to which a DC voltage for driving the motor is input; and
a control unit configured to control the motor,
wherein
the control unit executes:
first input confirmation processing of confirming first input of the DC voltage to the first input terminal or the second input terminal;
rotation direction setting processing of, when the first input to one input terminal of the first input terminal and the second input terminal is confirmed by the first input confirmation processing, setting a rotation direction of the motor based on which input terminal receives the DC voltage;

operation processing of operating the motor at a first rotation speed in the rotation direction set by the rotation direction setting processing;

second input confirmation Processing of confirming second input of the DC voltage to the other input terminal of the first input terminal and the second input terminal; and speed change processing of, when the second input to the other input terminal is confirmed by the second input confirmation processing, changing the rotation speed of the motor from the first rotation speed to a second rotation speed, in the speed change processing, the rotation speed of the motor is changed based on a time during which the DC voltage is input to both the first input terminal and the second input terminal.

10. The control device according to claim 9, wherein
in the speed change processing,
the rotation speed of the motor is changed based on a cumulative time of the input of the DC voltage to both the first input terminal and the second input terminal, and concerning the cumulative time,
increment of a count value of the cumulative time is continued during the input of the DC voltage to both the first input terminal and the second input terminal, and increment of the count value of the cumulative time is stopped during the input of the DC voltage to only one of the first input terminal and the second input terminal.

11. The control device according to claim 10, wherein
in the speed change processing,
the rotation speed of the motor is changed when the cumulative time becomes not less than the count value of the cumulative time set in advance as a change condition.

12. The control device according to claim 10, wherein
in the speed change processing,
when the cumulative time becomes not less than a first time determined in advance, the rotation speed of the motor is changed from the first rotation speed to the second rotation speed, and when the cumulative time becomes not less than a second time determined in advance and longer than the first time, the rotation speed of the motor is changed from the second rotation speed to a third rotation speed.

13. A non-transitory computer-readable storage medium storing a program configured to cause a computer of a control device including a first input terminal and a second input terminal to which a DC voltage for driving a motor is input, to execute:

activation processing started when the DC voltage is input to the first input terminal or the second input terminal;

first input confirmation processing of confirming first input of the DC voltage to the first input terminal or the second input terminal;

rotation direction setting processing of, when the first input to one input terminal of the first input terminal and the second input terminal is confirmed by the first input confirmation processing, setting a rotation direction of the motor based on which input terminal receives the DC voltage;

operation processing of operating the motor at a first rotation speed in the rotation direction set by the rotation direction setting processing;

second input confirmation processing of confirming second input of the DC voltage to the other input terminal of the first input terminal and the second input terminal; and speed change processing of, when the second input to the other input terminal is confirmed by the second input confirmation processing, changing the rotation speed of the motor from the first rotation speed to a second rotation speed, wherein in the first input confirmation processing,
when an input of a positive voltage to one terminal of the first input terminal and the second input terminal is continuing for a predetermined time, it is confirmed that the first input is performed, and in the second input confirmation processing,
when an input of a positive voltage to both the first input terminal and the second input terminal is continuing for a predetermined time, it is confirmed that the second input is performed.

* * * * *

UNITED STATES PATENT AND TRADEMARK OFFICE
CERTIFICATE OF CORRECTION

| | |
|---|---|
| PATENT NO. | : 11,855,574 B2 |
| APPLICATION NO. | : 17/848817 |
| DATED | : December 26, 2023 |
| INVENTOR(S) | : Naoto Arita, Satoshi Nishimoto and Koichi Nakano |

Page 1 of 1

It is certified that error appears in the above-identified patent and that said Letters Patent is hereby corrected as shown below:

In the Specification

Column 8, Line 14, "+side", should read: -- -side --

In the Claims

Column 19, Line 33, Claim 6, Line 5, "claim 5", should read: -- claim 1 --

Signed and Sealed this
Fifth Day of March, 2024

Katherine Kelly Vidal
*Director of the United States Patent and Trademark Office*